G. E. RIGBY.
FRAME FOR THE BODIES AND WHEELS OF SIDE CARS.
APPLICATION FILED AUG. 20, 1917.

1,315,332.

Patented Sept. 9, 1919.

3 SHEETS—SHEET 3.

Witnesses:

Inventor
George E. Rigby
By Joseph Chatwin
Atty

UNITED STATES PATENT OFFICE.

GEORGE EDWIN RIGBY, OF MANCHESTER, ENGLAND.

FRAME FOR THE BODIES AND WHEELS OF SIDE CARS.

1,315,332.  Specification of Letters Patent.  Patented Sept. 9, 1919.

Application filed August 20, 1917. Serial No. 187,162.

*To all whom it may concern:*

Be it known that I, GEORGE EDWIN RIGBY, a subject of the King of England, residing at Manchester, in the Kingdom of England, have invented new and useful Improvements in Frames for the Bodies and Wheels of Side Cars, of which the following is a specification.

This invention relates to improvements in side cars having a detachable frame for the side car wheels, used in connection with motor cycles.

Figure 1:
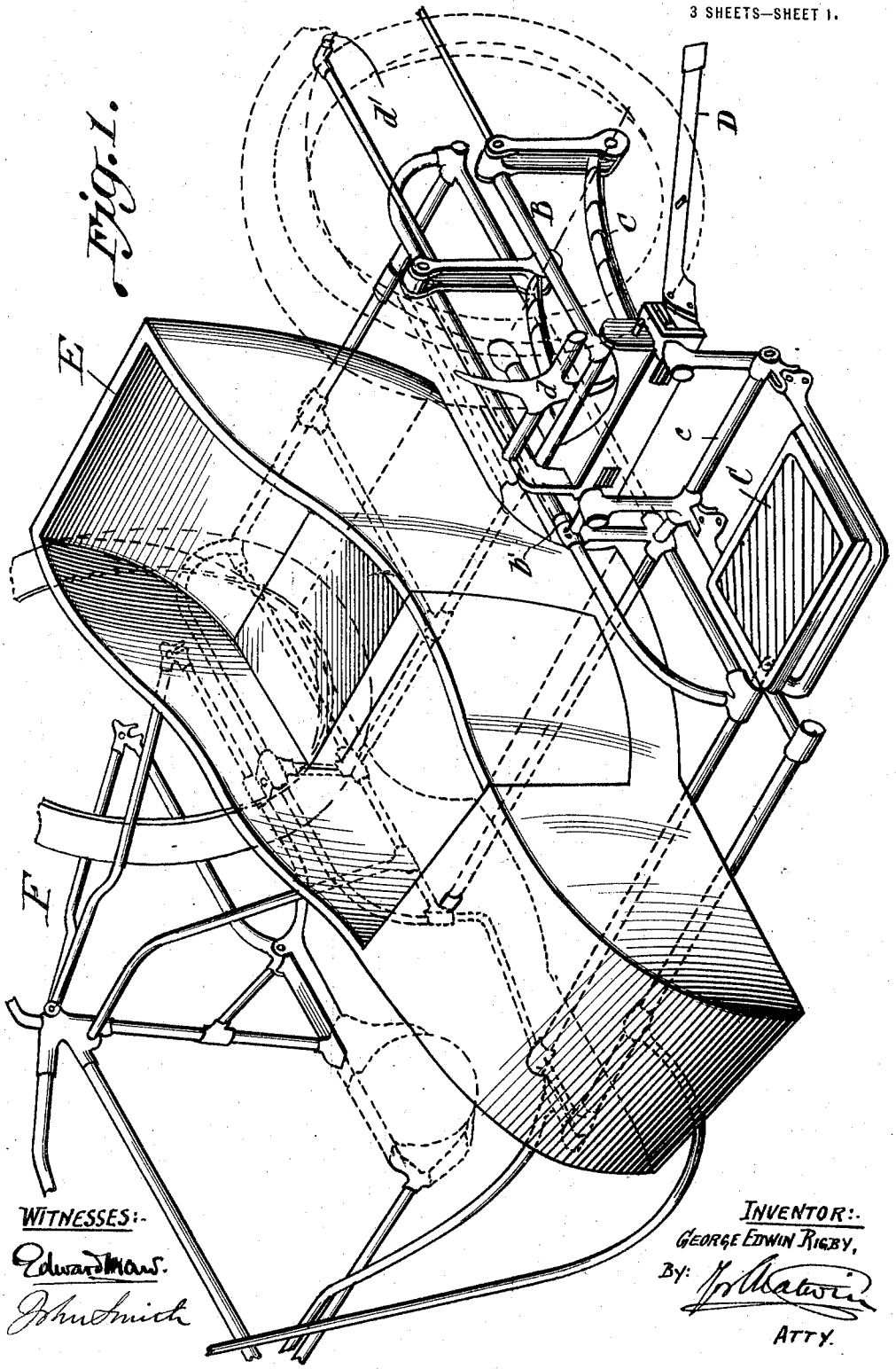
Figure 2:
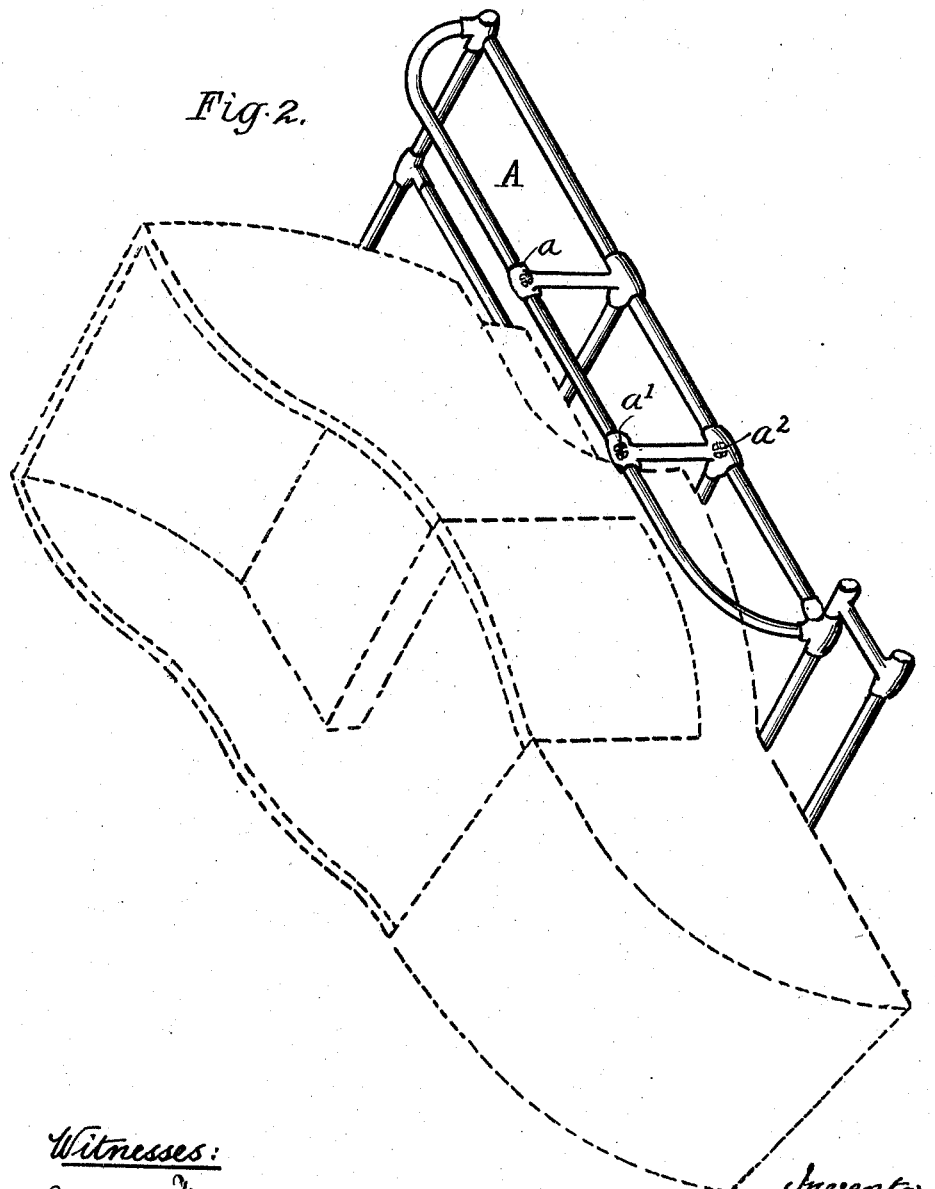
Figure 3:
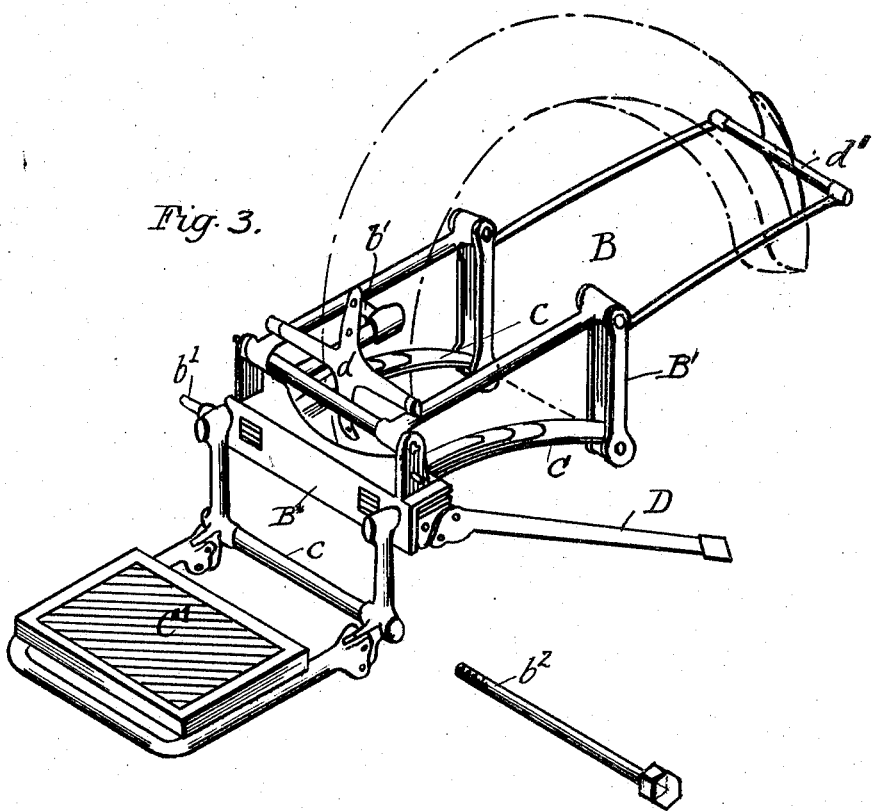
Figure 4:
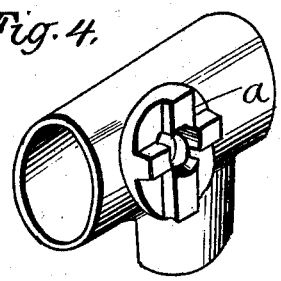
Figure 5:
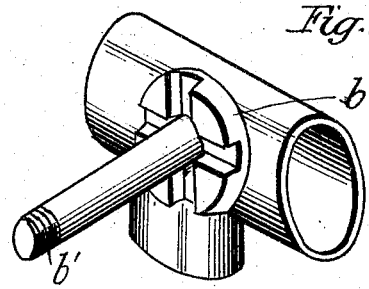

An object of my invention is to provide a detachable frame for the wheel of the side car which comprises in a single unit the wheel and its axle, wheel frame, two laminated springs, mudguard, stand and footboard, and simple means for securely fixing such frame to the side car frame. Another object is to provide corresponding securing and interlocking devices on the tubular T-joints forming part of the frames of the side car and the wheel. I attain these objects by the mechanism fully described with reference to the drawings in which:

Figure 1 is a perspective view of a motorcycle with the side car and the wheel frame unit attached thereto; Fig. 2 is a perspective view of the side car and its frame or chassis; Fig. 3, a perspective view of the wheel frame unit with the wheel and axle removed therefrom; Figs. 4 and 5, details of lugs $a$, $a^1$ and $b$ for attaching the wheel frame unit to the side car frame unit.

The side car frame or chassis A for attachment to the bicycle is made of any suitable design or construction and is provided with lugs $a$, $a^1$ and a tapped hole at $a^2$ by which to attach the wheel frame B.

The wheel frame B, or frame which carries the wheel axle and which may be of any known construction and arrangement of frame members, is fitted with two laminated springs C longitudinally applied thereto with the thick ends fast in the head piece B* of the frame B and with the eyes in hangers B$^1$. The frame is provided with lugs or memers $b$ by which it can be attached to the car chassis.

The lugs or members $a$, $a^1$ on the side car chassis A are made with crosswise ribs on the face and the lugs or members $b$ are made with corresponding grooves or recesses, or vice versa, which when bolted together take the weight and longitudinal or propelling thrust relieving the bolts $b^1$ of shearing stresses.

The bolts $b^1$ are preferably cast or brazed into the lugs $b$ and pass through the lugs $a$, $a^1$ and the bolt $b^2$ passes through the transverse tube member $c$ of the footboard or step bracket and is screwed into the part $a^2$ of the lower side tube of the chassis. The lugs $a$, $a^1$ and $b$, are fast on the sides of tubular T-joints of both frames. The wheel frame B is made with a footboard or step C$^1$ preferably pivoted or hinged to enable it to be folded, with a stand D and mudguard brackets $d$, $d^1$. The side car body is denoted by E and the motorcycle by F.

I claim:

1. A sidecar frame or chassis having tubular T-joints, side connecting lugs fast on the tubular T-joints in combination with a wheel frame, having an angular head-piece and carrying spring hangers, a wheel and axle mounted in said wheel frame, two longitudinal laminated springs fast in said head-piece and secured in said hangers, mudguard, stand, and footboard on said wheel frame and anti-shearing lugs at the side of same for engagement with those on the chassis.

2. In a sidecar, a chassis, tubular T-joints for same, perforated lugs fast on the outer side of said joints, ribs on the face of the lugs, in combination with a wheel frame, a wheel and axle in same, and lugs at the side of the wheel frame, crosswise grooves or recesses in the face and bolts fast in the center of these lugs.

GEORGE EDWIN RIGBY.

Copies of this patent may be obtained for five cents each, by addressing the "Commissioner of Patents, Washington, D. C."